Figure 1:
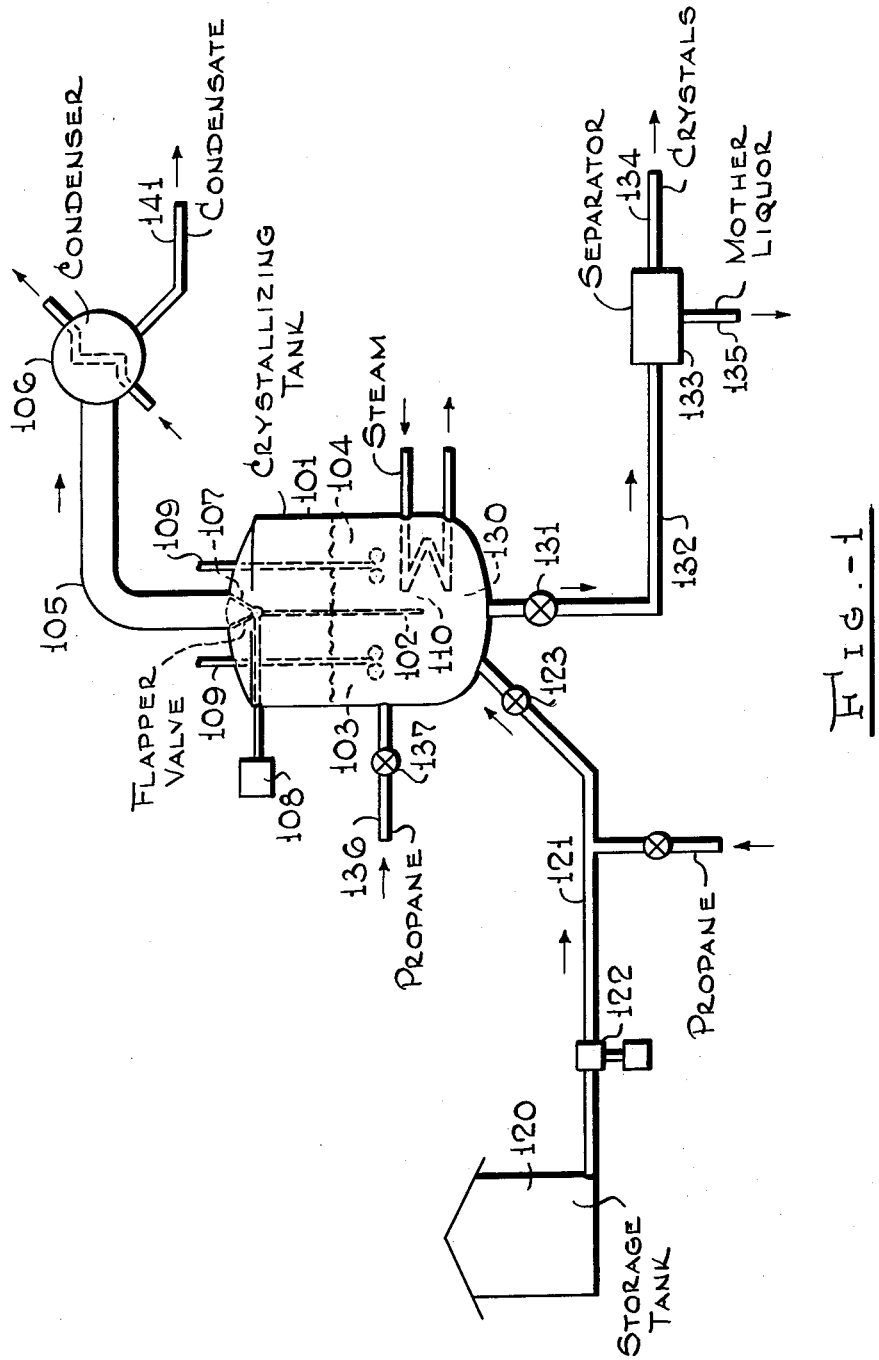

Nov. 29, 1955  S. F. PERRY  2,725,338
WAX CRYSTALLIZATION PROCESS AND APPARATUS
Filed March 1, 1952  2 Sheets-Sheet 1

Stephen F. Perry Inventor
By W. O. Hulman Attorney

Nov. 29, 1955  S. F. PERRY  2,725,338
WAX CRYSTALLIZATION PROCESS AND APPARATUS
Filed March 1, 1952  2 Sheets-Sheet 2

Stephen F. Perry  Inventor
By W. O. Heilman  Attorney

United States Patent Office 2,725,338
Patented Nov. 29, 1955

2,725,338

WAX CRYSTALLIZATION PROCESS AND APPARATUS

Stephen F. Perry, Westfield, N. J., assignor to Esso Research and Engineering Company, a corporation of Delaware Application March 1, 1952, Serial No. 274,408

17 Claims. (Cl. 196—18)

This invention concerns an improvement in the art of crystallization. More specifically it relates to an improved method of agitation in crystallization operations. It is particularly applicable to the crystallization and separation of hydrocarbon wax from waxy mineral oils.

Crystallization in general is an operation by which one substance may be mechanically separated from others. Briefly, it entails the solidification of one component from a solution or melt in the form of crystals. The crystals to be produced are then separated from the mother liquor by methods such as filtration or centrifuging.

Commercial interest in crystallization extends to a great many materials of widely varying physical and chemical properties and crystallizing behavior, but certain generalizations can be made.

Crystallization embraces many theoretical questions, but the practical approach to this subject is as yet largely empirical. There are two main steps in crystallization. As a first step, it is necessary that crystal nuclei form in the solution or melt. As a second step, these nuclei must then grow in size to a point such that the crystals can be readily separated from the mother liquor. Both steps are dependent on supersaturation which is the driving force in each case. The second step is concerned also with the diffusion of the solute from the solution to the faces of the crystal nuclei formed in the first step.

There are two main methods by which supersaturation and crystallization are achieved: (1) cooling and (2) evaporation. The present invention has application to both of these methods.

It is generally desirable in all crystallization processes to promote the formation of large crystals which are uniform in size, inasmuch as the separation of the crystals from the mother liquor in a subsequent centrifuging or filtering step is greatly facilitated. The control of the number and size of the crystals is governed by roughly the same factors regardless of the particular crystallization procedure employed. For example, it has been observed that the number of crystal nuclei formed in any given case is usually a direct function of the degree of supersaturation attained. The rate of crystal growth increases with increasing supersaturation, but not to as great an extent as the rate of nucleus formation. In other words, excessive supersaturation usually results in the formation of large numbers of crystal nuclei with the result that the average size of the final crystals is small. It follows, therefore, that excessive supersaturation of a solution is to be avoided if large crystals are desired.

Among the main factors affecting the degree of supersaturation produced in a given crystallization are: (1) the rate of cooling or evaporation of the solution and (2) the degree of agitation employed. "Seeding" of the solution— i. e. addition of small crystals to act as nuclei, is employed in some cases to minimize supersaturation.

Once crystal nuclei have formed, they then grow by the deposition of additional solute on the crystal faces of each nucleus. Since the migration of a solute from solution to the faces of the nuclei is a diffusion phenomenon, it is essential that some degree of agitation be used to keep the crystals in continuous contact with liquid having a high concentration of solute. By maintaining relative motion between the crystals and the mother liquor, build up of a static film of lean solution at the crystal surface is minimized, thereby insuring rapid diffusion and promoting rapid crystal growth. With easily damaged crystals, however, the degree of motion must not be too violent, otherwise fracture of the crystals already produced will occur, resulting in the production of undesirably small crystals.

Some materials have a tendency to form irregularly shaped crystals and crystal agglomerates, which trap mother liquor and make the subsequent separation less complete. This tendency may be minimized by the use of low rates of chilling or evaporation and increased agitation. In certain cases, at least, such as the dewaxing of petroleum fractions, the nature and amount of solvent present during chilling, and the presence or absence of traces of certain "crystal modifiers" are also important variables influencing the size and shape of the crystals formed, and hence the ease and completeness of separation in subsequent filtration or centrifuging.

The present practice of attaining the desired degree of agitation in a given crystallization operation varies with the apparatus employed. The types of apparatus used for crystallization fall in three main classes, (1) batch-type cooling crystallizers, (2) continuous cooling crystallizers, and (3) crystallizing evaporators and vacuum crystallizing evaporators.

In the cases where batch-type cooling crystallizers are employed, agitation is sometimes limited to that provided by the convection currents set up by the cooling procedure. For a more uniform environment, however, and hence more uniform crystal size, mechanical mixers such as stirrers equipped with propellers, are employed.

Continuous cooling crystallizers in general are of two types. The first of these types is usually a semi-cylindrical trough equipped with a cooling jacket. Agitation is produced in this type by slow-speed, low pitch screw agitators positioned in the troughs or by suitable rollers which rock the entire trough slowly back and forth in cradle-fashion.

The second type of continuous cooling crystallizer is the popular double-pipe arrangement which is widely used in the petroleum industry for the dewaxing of mineral oil. The mineral oil passes through the internal pipe while a coolant flows in the annular space between the two pipes. Agitation is here supplied by longitudinal or helical blades which scrape the internal surface of the pipe in which the crystals of wax are formed. The flow of the oil in the internal pipe also affords a certain degree of mixing.

More vigorous agitation than that obtained in existing commercial double pipe chillers has been found desirable, specifically in the solvent dewaxing of mineral oils; but obtaining the desired agitation level throughout these chillers has proven to be a difficult mechanical problem. For example, increasing the speed of the scrapers is impractical because of the excessive wear which results even at the low speed now employed, namely 12 R. P. M. The use of high speed rotating devices for the purposes of agitation also presents a very difficult problem concerning bearing alignment in the long lengths of pipe involved. In some instances the sections of pipe employed may be as much as 50 ft. in length.

The third major type of recrystallization apparatus consists of the crystallizing evaporators and the vacuum crystallizers in which the solvent is evaporated from the solution being processed. Agitation is here produced by the use of centrifugal pumps or impellers which circulate the mother liquor within the evaporator and also by the boiling action itself.

The present invention comprises a method of agitation in which a pulsating force is applied to the mother liquor during the crystallization step, causing pulsations in flow. The flow pulsations are defined as periodic, direct reversals of flow, although, when superimposed on a flowing stream, the net effect may be merely a periodic change in the velocity of flow. It has been discovered that these pulsations have a surprising and markedly favorable effect on the characteristics of the crystals formed, as measured by the filtration qualities of the resultant slurry—i. e. (1) the rate at which the crystals can be separated from the mother liquor, and (2) the purity of the crystallized filtered product. These improved qualities stem from larger and probably more uniform crystal size and more regular crystal shape. The mechanism by which the pulsations achieve these results is not precisely known, nor is it intended that the scope of this invention be limited to any particular mechanism. However, one probable effect of the pulsations is that they cause the mother liquor and the crystals contained therein to have motion relative to one another. As described earlier, such motion keeps the crystals already formed in closer contact with liquor having a high concentration of solute with the result that larger crystals are produced. The production of large crystals in turn results in high rates of separation of the crystals from the final mother liquor by filtration or centrifuging.

While other forms of agitation also tend to produce a relative motion between the crystals and the mother liquor as described above, the pulsations described in this invention possess the unique advantage that they can be applied continuously with relative uniformity to the entire slurry being chilled. With other agitation devices such as propeller mixers and pumparound systems, only a small part of the total material is given maximum agitation at any one instant. This may result in undesirable breakage of crystals at the points of maximum impact, even though the average level of agitation is still below that necessary for optimum results. The uniformity of agitation by pulsations therefore allows the degree of agitation to be critically adjusted to the optimum conditions for a given crystallizing system and also by its uniformity enables the production of a more uniformly sized crop of crystals.

The energy of the pulsations described in this invention may also have a direct but as yet incompletely understood effect on the rates of nucleation and crystal growth. The fact that certain frequencies of pulsations result in an optimum filter rate is a strong indication that this mechanism may be involved. Furthermore, it is well known that energy is required to initiate and grow crystals and that mechanical energy can start nucleation. For example, with certain supersaturated solutions a tap on the container will cause a cloud of crystals to develop almost simultaneously. It is therefore possible that with pulsations, crystallization of a given material can be carried out at a given rate with a lower degree of supersaturation, which would be expected to result in more favorable crystal growth.

Another factor contributing to improved crystal formation may be the improved heat transfer which might be expected because of the pulsations. This cause, however, could only account for a small fraction of the improvements that have been found.

In the crystallization of wax from petroleum fractions in the presence of methyl ethyl ketone-aromatic solvents, in an otherwise static system, pulsing rates of about 20–300 pulses per minute when using pulsing amplitudes of about ¼ inch to 4 inches have been found to be critical for the purposes of this invention. Pulsing rates of less than 20 pulses per minute were insufficient because the degree of agitation was insufficient for good crystal formation and the wax crystals produced under these conditions formed gels extremely difficult to separate from the oil. Pulsing rates above 300 pulses per minute also give poorer results. This may be partly because the resulting practicable pulse amplitude becomes too small for good agitation and partly for reasons as yet incompletely understood but associated with the direct effect of the pulsation energy on nucleation and crystal growth.

These limitations may vary somewhat when pulsations are used to augment other forms of agitation. Critical pulsation rates may also vary somewhat for other crystalline materials.

Pulsations of the type described in this invention are preferably embodied in such a manner as to be transmitted with minimum variation in amplitude throughout the entire body of the mother liquor. They are preferably superimposed on a mild random mixing which is sufficient to avoid undesired large variations in temperature. Such random mixing may be caused as in a continuous cooling crystallizer by the flow of the mother liquor itself or by objects such as scrapers positioned within the apparatus. In the case of crystallizing evaporators or batch-type cooling crystallizers, such random mixing may be caused by boiling of the solvent, by a pumparound operation, or by the use of low speed propellers, paddles, etc.

A tank-type batch crystallizer or an evaporative crystallizer can be readily modified to employ the pulsation technique described in this invention by installing a vertical partition through the center of the tank, leaving an opening in the lower part of the tank between the two compartments formed by the partition. It is particularly desired that the cross-sectional area of this opening be about the same size as the horizontal cross-sectional area of each compartment. A suitable pulsating means is then incorporated with the tank to cause the liquid within the tank to flow back and forth between the compartments in a pulsating manner. It is especially contemplated that pressure be applied alternately to the surface of the liquid in each compartment to obtain a pulsating flow of the type desired. This type of action can also be accomplished by a reciprocating piston connected to the vapor space of one of the compartments. In the case of evaporative crystallizers or crystallizers making use of auto-refrigeration and partitioned into two compartments as described above, the pulsating pressure could be obtained by use of a flapper valve which would permit the vapors to be drawn off the top of each compartment alternately.

Figure 2:
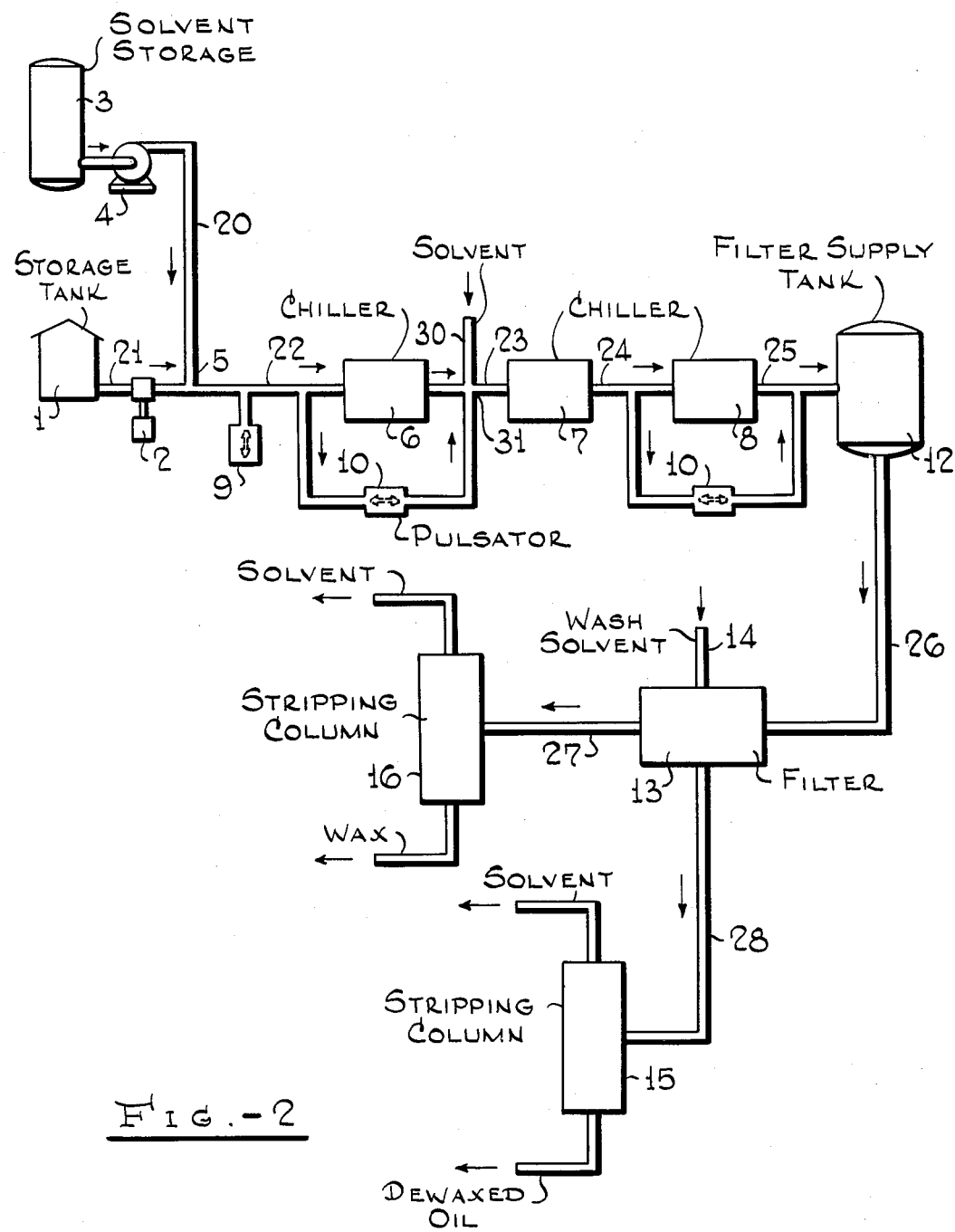

The nature of this invention, as well as its advantages may be understood by reference to the accompanying drawings, in which, Fig. 1 illustrates a crystallizing evaporator employing the principles of this invention, and Fig. 2 illustrates how this invention can be applied to a crystallizer of the continuous cooling type.

Referring first to Fig. 1, the numeral 101 designates a crystallizing tank of the evaporative batch type. A vertical partition 102 positioned within the tank divides the tank into two compartments 103 and 104. This vertical partition preferably extends from the top of the tank to a position near the bottom of the tank. It is particularly contemplated that the space between the lower extremity of the partition and the bottom of the tank be about the same cross-sectional area and shape as the cross-sectional area of each compartment. A conduit 105 pierces the top of the tank to permit vapors within the tank to escape. These vapors can be subsequently condensed in a condenser 106 and withdrawn as condensate 141. A flapper valve 107 positioned within the tank permits vapors to flow from one or both compartments as desired, through the conduit to the condenser. Suitable mechanical means 108 are employed to actuate the flapper valve so as to alternately seal one compartment and then the other from the conduit. This mechanical means may be a mechanism of the pneumatic, hydraulic, or electrical type.

Suitable mechanical means 109 may be employed for the purpose of auxiliary agitation. For the sake of illustration, two propeller-type mixers are shown in the drawing. A heating means 110 which may consist of steam coils, electrical heating elements and the like may be employed.

Liquid containing the material to be crystallized flows from a storage tank 120 through conduit 121 into the crystallizing tank. Suitable pumping means 122 may be employed to assist in the transfer of the fluid. When a desired amount of liquid has been charged to the tank, valve 123 is closed. The liquid within the tank is then caused to vaporize. This vaporization may be initiated in one of two ways; first, heat may be supplied to the liquid by heating means 110. Second, in some instances vaporization may be obtained by merely releasing the pressure on the liquid. This can be accomplished, for example, by means of the flapper valve 107. In either case the vapors formed above the body of the liquid in each compartment may be released through conduit 105 by movement of the flapper valve 107.

Referring specifically to Fig. 1, it will be noted that compartment 104 is sealed off from conduit 105 when the flapper valve is positioned as indicated. It will also be noted that with the flapper valve in this position there is direct access between compartment 103 and the conduit. It is readily apparent that with the apparatus in this condition a pressure differential will exist above the liquid in the two compartments. The pressure above the liquid in 104 being greater than that above the liquid in compartment 103 will cause the liquid to flow from the former compartment through space 130 to the latter compartment. By moving the flapper valve so as to seal off compartment 103 from the overhead conduit and to connect conduit 104 directly to the conduit, it is apparent that a new pressure differential will exist, causing the liquid within the tank to then flow through space 130 in the opposite direction. By alternately sealing off one compartment and then the other by means of the flapper valve and a suitable mechanical means 108, it is further apparent that a pulsating flow of the liquid between the two compartments will be generated. The frequency and amplitude of the pulsations can be controlled by the rate at which the flapper valve is actuated.

By making space 130 approximately the same geometric size and shape as the cross-sectional area of compartments 103 and 104, it is apparent that the body of liquid in the crystallizing tank will flow between the compartments in a column-like manner and with a minimum of uncontrolled agitation.

Auxiliary agitation is preferably supplied by suitable mechanical means to insure a mild amount of random mixing. This auxiliary agitation can be induced by the shape of the vessel itself or by means of propeller mixers, vanes, and the like. It has been found that a certain amount of such auxiliary agitation is desirable for the purpose of avoiding completely laminar flow of the liquid.

When a sufficient amount of crystallization has occurred by boiling away a desired amount of solvent, valve 131 is opened and the contents of the crystallizing tank permitted to flow through conduit 132 to a separating device 133. This separating device may be a settling tank, a rotary filter, a plate and frame press, a centrifuge, etc. The mother liquor and the crystals contained therein are here separated from one another to form the desired crystal 134 and mother liquor products 135.

This form of apparatus can be readily applied to crystallization processes of the type in which the vaporization of the solvent is utilized for the purpose of auto-refrigeration. A good example of this type of process is that in which wax is crystallized from a waxy lubricating oil distillate or residuum by the conventional propane dewaxing technique. In this case a mixture of liquid propane and waxy lubricating oil is charged to the crystallizing tank at elevated pressure and temperature. A portion of the propane is allowed to vaporize with the result that the remaining propane and oil mixture is chilled to a temperature sufficient to cause the precipitation of the wax dissolved in the oil. Propane to oil ratios of about 2/1 to 4/1 are employed. The mixture is generally chilled from about 120°–160° F. down to between 0° F. and —40° F., at chilling rates between about 2° F. per minute and 10° F. per minute.

When an oil fraction is dewaxed by the propane method it is conventional to add small amounts of liquid propane directly to the crystallizing tanks in order to make up for the amount of propane lost by vaporization. Such "make-up" propane can be added through conduit 136 and valve 137. It is also conventional to employ more than one crystallizing tank in order to put this process on a more continuous basis.

It will be noted that the heating means 110 illustrated in Fig. 1 is positioned directly within the crystallizing tank. It is understood that such heating means may in some instances be preferably located outside of a crystallizing tank. For example, the tank may be steam-jacketed. It is also understood that materials such as dewaxing aids or crystal modifiers may be added during such a process for the purpose of further controlling the rate of crystallization and the nature of the crystals produced. It is further understood that additional chilling means such as cooling coils may be employed.

The apparatus just described may be modified and used in various ways without departing from the scope and spirit of the present invention. For example, an attractive method for propane dewaxing a lubricating oil distillate or residual fraction consists in charging such a fraction to the crystallizing tank 101 along with 0.2 or less volumes of liquid propane per volume of feed stock. Sufficient propane is then evaporated to chill the charge to a point between the cloud point of the mixture and the temperature at which it becomes too viscous for practical handling, normally between 60° F. and 100° F. for feedstocks containing from 6–50% wax. During this step, valve 107 is positioned such that vapors in both compartments, 103 and 104, simultaneously enter conduit 105. Thus, no pulsating flow is as yet set up between the compartments.

When the temperature of the mixture reaches the point described above, the full amount of propane solvent is then added to the crystallizing tank and the mixture cooled down to filtration temperature (about —40° F. to 0° F.) with pulsatory motion. This motion, of course, is obtained by actuating valve 107 at frequencies sufficient to produce the pulse frequencies and amplitudes described earlier. Thus, a two-step dewaxing process is available in which a waxy lube oil is (1) chilled initially under conditions favoring the formation of crystal nuclei and (2) subsequently chilled under conditions particularly favorable to crystal growth. Auxiliary agitators, steam coils and the like may be employed as described earlier.

In continuous crystallizers it is possible to apply pulsations directly on the flowing stream. An example of this type of operation can be found in the dewaxing of mineral oils as carried out in double-pipe continuous cooling crystallizers. The present invention is particularly attractive for use in this type of apparatus, and this application will be described in detail.

Double-pipe continuous crystallizers as mentioned earlier are widely used in the petroleum industry for the solvent dewaxing of mineral oils with a solvent mixture comprising an aromatic solvent and a polar solvent. Examples of such mixtures are acetone-benzene, methyl ethyl ketone-benzene, methyl ethyl ketone-toluene and methyl ethyl ketone-benzene-toluene.

Other solvents which may be employed for dewaxing mineral oils for the purposes of the present invention include methyl propyl ketone, methyl butyl ketone, diethyl ketone, SO$_2$-benzol, certain chlorinated solvents and light hydrocarbons.

In general, a waxy oil is diluted with one of the solvents named above and the resulting mixture is then cooled in double-pipe crystallizers. These crystallizers are in effect double-pipe heat exchangers. The waxy oil and solvent mixture is pumped through the interior pipe while first the cold filtrate and in subsequent sections of the apparatus a refrigerant such as liquid ammonia or propane is circulated through the annular space between the interior pipe and the exterior or jacket pipe. Scrapers rotating at low speed in the interior pipe containing the wax and oil slurry serve to keep wax crystals from adhering to the interior wall of the crystallizer.

Conditions in the continuous double pipe crystallizers are so adjusted that the desired final temperature is reached and a desired amount of wax thereby crystallized. The resultant wax-oil-solvent slurry is fed to a rotary filter and the wax filtered from the oil and solvent. Additional amounts of fresh chilled solvent are usually passed through the wax cake on the rotary filter to wash out occluded oil.

There are numerous possible ways of obtaining flow pulsations in this type of crystallizing equipment. For example, present feed and solvent pumps, if of the reciprocating type, could be modified so as to provide an appreciable time interval between successive strokes or to give alternate fast and slow or large and small strokes. Another way is to interrupt the flow in a pulsating manner by the use of reciprocating slide valves or their equivalent, in conjunction with suitable surge chambers if necessary. Another very desirable method is to tie into the chilling line one or more simple reciprocating pistons to alternately inject and withdraw slurry from the chilling system. This method will be described in more detail in a later section. It is preferred that the method of applying pulsations be independent of the feed rate and variable over a suitable range both as to frequency and amplitude, so that these can be adjusted to obtain optimum slurry quality (either maximum filter rate or most complete separation on filtration) in any given operation.

To investigate the use of pulsations, experimental dewaxing operations were carried out on several waxy petroleum fractions.

EXAMPLE I

A waxy lube oil distillate was employed which is characterized by the following physical properties.

Table 1

| | |
|---|---|
| Gravity—°API | 31.9 |
| Flash point—° F | 470 |
| Viscosity—SSU at 210° F | 53.6 |
| Pour point (ASTM)—° F | 120+ |
| Color—Tag-Robinson | 3.5 |
| R. I. at 67° C | 1.4559 |
| Dry wax content—wt. per cent | 20 |
| Distillation at 10 mm. Hg: | |
| I. B. P.—° F | 310 |
| 10%—° F | 517 |
| 30%—° F | 578 |
| 50%—° F | 599 |
| 70%—° F | 620 |

A series of dewaxing experiments was carried out in a 2 inch diameter U-shaped glass tube fitted with a reciprocating piston at the end of one leg. Each leg of the tube was approximately 16 inches long. Mixtures of the waxy oil described above and a solvent comprising 50% methyl ethyl ketone, 29% benzol and 21% toluol in a volume ratio of 3.3/1 solvent to oil were then chilled in this tube by cooling of a bath which surrounded the tube.

Stationary baffles were placed in the tube to reproduce approximately, when employing pulsations, the degree of turbulence existing at present in conventional double-pipe crystallizers.

The solvent was added to the oil in two ways. According to the first and conventional way, the entire amount of solvent was added to the oil at the beginning of the dewaxing operation. The second procedure consisted in adding the solvent to the oil in increments throughout the cooling period. The oil and solvent mixtures were then chilled from about 130° F. to 0° F. at chilling rates of about 2.4 to 3.0° F. per minute. The maximum temperature differential existing between the cooling medium and the slurry ranged from about 7 to 30° F.

Pulsation frequencies of 33 to 200 cycles per minute were employed throughout chilling and proved to be very effective in increasing the rate for filtering the crystalline wax from the oil. Pulsation amplitudes of ½ inch to 2¼ inches were used. With a pulsation stroke of 1⅝" and a pulsation frequency of 60 cycles per minute, the resulting filter rate was extremely high. Data illustrating the beneficial results of employing these pulsing conditions are presented in the following table.

Table 2

KETONE DEWAXING OF LUBE DISTILLATE INFLUENCE OF CHILLING CONDITIONS

| Agitation | Mild Mechanical [1] | | Vigorous Mechanical | Flow Pulsations (1⅝" stroke, 60 cycles/min., with baffles) | |
|---|---|---|---|---|---|
| Solvent Addition Method | Conv. | Incr. | Conv. | Conv. | Incr. |
| Filter Rate (no wash), Gal. Dewaxed oil/hr./sq. ft.[2] | 3.8 | 3.9 | 6.3 | 14+ | 5.2 |
| Dewaxed Oil Yield, Vol. Percent: | | | | | |
| No wash | 33 | 60 | 69 | 45 | 58 |
| Standard wash [3] | 45 | 72 | 80 | 58 | 72 |

[1] Roughly equivalent to present plant conditions.
[2] Results compared on basis of equal filtering time, and expressed as the output of a continuous rotary vacuum filter operating on a 75 second cycle with 40% submergence in the slurry (30 seconds filtering time per cycle).
[3] Ratio of wash time to filtering time fixed to simulate operation of a commercial rotary filter.

It is especially notable that the "conventional" method of adding all of the dewaxing solvent at the beginning of the cooling step gives a filter rate far higher than that obtained by incremental addition during chilling, when using pulsations in both cases. This superiority is felt to be due to the fact that the motion of the crystals relative to the mother liquor as caused by pulsations is more effective when the viscosity of the mother liquor is decreased. However, the benefit in filter rate for employing pulsations is apparent under both conditions.

EXAMPLE II

The criticality of the pulsation frequency for a given set of operating conditions is fully brought out in the following table. The data in this table were obtained under the same operating conditions employed in obtaining the data in Table 1.

Table 3

| | Pulsations/Minute [1] | | | |
|---|---|---|---|---|
| | 33 | 60 | 110 | 200 |
| Filter Rate, Gallons Dewaxed Oil/hr/sq..ft | 9.2 | 14+ | 10+ | 4.5 |
| Dewaxed Oil Yield, Vol. Percent: | | | | |
| No wash | 32 | 45 | 49 | 59 |
| Standard Wash | 43 | 58 | 61 | 73 |

[1] 1⅝" pulsation stroke.

As may be seen, an extremely high filter rate of 14+ gallons of dewaxed oil per hour per square foot was obtained at the 60 cycle frequency when using pulsations of the type described above. It will also be noted that the yield of dewaxed oil was a direct function of the pulsing frequency. It will be appreciated that the dewaxed oil yield is a measure of the completeness of separation between oil and wax, since the charge stock contained 80% oil and any oil not recovered as dewaxed oil remains associated with the wax. It is apparent then that the present invention affords a precise and powerful control over both the filter rate and the completeness of separation by filtration. Based on general experience, a similar advantage would be shown if employing centrifuges rather than filters as the separating means.

EXAMPLE III

As previously mentioned, stationary baffles were employed in the foregoing experiments so that turbulence roughly equivalent to that in the present plant chillers would be obtained. Without any baffles or means of agitation other than the pulsations, the flow back and forth appeared to be perfectly streamlined and a large temperature gradient developed between the material near the tube wall and that in the center of the tube, a condition known to be unfavorable to good crystal formation. The baffles created sufficient turbulence to maintain reasonable uniformity throughout the slurry. A comparison of runs with and without the baffles, with the same feed stock and with conditions similar to previously described experiments, is included in Table 4.

*Table 4*

|  | Mild Agitation, No Pulsations [1] | Flow Pulsations 110 cycles/min., 2¼" stroke | |
|---|---|---|---|
|  |  | Baffles | No Baffles |
| Solvent Addition Method | Conventional. | Conventional. | Conventional. |
| Filter Rate (no wash), gal. Dewaxed Oil/hr./sq. ft. | 3.8 | 7.5 | 6.1. |
| Dewaxed Oil Yield, Vol. Percent: |  |  |  |
| No wash | 33 | 53 | 36. |
| Standard Wash | 45 | 69 | 51. |

[1] Roughly equivalent to present plant conditions.

It will be noted that both runs with pulsations gave results superior to the standard run, but that the use of the baffles increased the effectiveness of the pulsations considerably. It is visualized that, without the baffles (or other means of mixing) the relative motion between the crystals and their surrounding liquid which is induced by the pulsations is less effective because the crystal "sees" the same liquid repeatedly rather than fresh liquid.

EXAMPLE IV

The effect of pulsations was investigated in the solvent dewaxing of three waxy petroleum fractions varying in both boiling range and crude source and containing waxes of widely different crystallizing characteristics. The results are compared with standard operations (using mild agitation but no pulsation) in Table 5.

*Table 5*

| Feed Stock | Paraffin Distillate | | Extracted Lube Distillate | | Extracted Bright Stock | |
|---|---|---|---|---|---|---|
| Boiling Range at 10 mm. Hg: | | | | | | |
| 5% off, °F | 394 | | 430 | | 603 | |
| 95% off, °F | 574 | | | | | |
| Percent at 620° F | | | 70 | | | |
| Wax Content, wt. percent | 45 | | 20 | | 17 | |
| Pulsations (60 cycles/min. 1⅝" stroke, with baffles) | No | Yes | No | Yes | No | Yes |
| Filter Rate, gal. dewaxed oil/hr./ft.² | 9.6 | 11.6 | 3.8 | 14+ | 8.0 | 11.3 |
| Oil Content of Wax, Percent: | | | | | | |
| No wash | 33 | 30 | 70 | 63 | 37 | 35 |
| Standard Wash | 11 | 5 | 63 | 52 | 19 | 19 |

By far the greatest improvement for pulsations, over threefold increase in filter rate, was obtained with the extracted lube distillate, a stock characterized by a comparatively low filter rate under present plant conditions. The least improvement in filter rate, about 20%, was obtained with the paraffin distillate, which is a comparatively favorable stock under present conditions. Thus, it appears that the use of pulsations has particular application in systems which tend to crystallize unsatisfactorily (giving low filter rates and relatively incomplete separation) under present conditions. It may also be possible to use more economic but otherwise less favorable crystallization conditions (faster chilling, for example) and still obtain satisfactory results, by using pulsations.

The nature of this invention as well as its advantage may be further understood by reference to the accompanying drawing, Fig. 2. This drawing illustrates the application of the invention as it might be carried out in the dewaxing of a mineral oil to obtain crystalline wax and a dewaxed oil. The particular dewaxing process shown is one in which a solvent mixture such as methylethyl ketone-benzene-toluene is used to crystallize and separate wax from a waxy lubricating oil fraction.

A waxy petroleum oil such as a paraffin distillate, a lubricating oil distillate of a waxy residuum is fed continuously from a storage tank 1 through line 21 and a pump 2 which is usually of the double acting, duplex reciprocating type. The solvent is taken from storage tank 3 through line 20 and a pump 4 (generally a centrifugal pump) and is mixed with the waxy oil feed at point 5. The ratio of solvent to oil is usually in the range of 2/1 to 4/1. All of the solvent may be added to the oil at this point or it may be added in increments while the oil is being chilled.

The oil and solvent mixture then flows through lines 22, 23, 24 and chillers 6, 7, and 8, as a result of which its temperature is lowered sufficiently to produce the desired degree of dewaxing. Each of these chillers is usually made up of a nest of parallel pipes externally cooled. The oil and solvent mixture flows through the pipes while a heat exchange medium or refrigerant is circulated around the exterior of the pipes. The pipes may be either jacketed with larger size pipes or they may be actually immersed in large tanks or baths. Scrapers positioned within each pipe rotate at slow speed to continually remove any wax adhering to the internal surfaces of the pipes and to keep the wax crystals dispersed through the apparatus.

Pulsations of the type described by this invention can be provided by installing pulsators 9 and 10. Pulsator 9 in most instances will provide a sufficient pulsating force for most crystallization purposes. However, if the pulsations are dampened unduly by passage through U-bends or by considerable lengths of pipe, additional pulsators 10 may be installed at necessary points in the apparatus. Where more than one pulsator is employed in a particular piece of apparatus, it is contemplated that their operation be coordinated to supplement each other. The pulsators act to withdraw a portion of the slurry from a line or a chiller and then return this portion to the line or chiller.

In the design and operation of the present solvent dewaxing plants employing continuous chilling, conventional pumping practice is followed. This means that the flow is made as steady as is practicable. In typical plants the solvent is pumped by centrifugal pumps and the waxy oil fed by a double acting, duplex reciprocating steam pump. It is a common practice to install surge chambers downstream from reciprocating pumps to further even out the flow of the liquid pumped. Also pressure or flow controllers are generally present which would have the effect of evening out the flow still further. For these reasons the pulsations present in a typical dewaxing plant resulting from the use of conventional reciprocating pumps are insufficient for the purposes of this invention.

To obtain full benefit from the present invention, it is contemplated that conventional pumps be used for the transfer of the fluids involved but that other devices, which can be controlled independently of feed rate, be used to supply the pulsations. The use of one or more reciprocating pistons 9 and 10 connected to the slurry line as illustrated and driven by a mechanism capable of providing pulsations of variable stroke and frequency, is a highly satisfactory method. The driving mechanism may be either of the type now used for steam driven pumps, or may be a mechanical drive utilizing eccentrics or cams. Other suitable devices for obtaining the pulsations were mentioned earlier.

Obviously, many types of apparatus and devices may be used to provide pulsations of the type disclosed in this invention. The examples described are merely illustrative of apparatus that would be suitable.

Pulsing rates of about 20 to 300 pulses per minute with pulsing amplitudes of about ¼ inch to 4 inches are successful in assisting crystallization and thereby make easier the separation of the resulting crystals from the mother liquor in process employing the present invention. It is especially preferred that pulsing rates of 30 to 120 pulses per minute with pulse amplitudes of ½ to 3 inches be used in processes involving the crystallization and separation of wax from waxy petroleum fractions. It is to be understood that the pulsing amplitudes refer to the magnitude of movement imposed on the body of liquid in a crystallizer and not necessarily to the movement of the pulsing device.

During the chilling phase of a typical petroleum dewaxing process the temperature of the oil and wax slurry is lowered from about 130° F. to about 0° F. As the chilled slurry leaves the final chiller it passes through line 25 to a filter supply tank 12 from which it flows through line 26 to filter 13. The filtration step may be carried out by any of the commercially used methods, the use of continuous vacuum rotary filters being preferred. During the filtration operation the wax cake is generally washed with additional solvent 14 to decrease the oil content of the wax produced. The wax is discharged from the filter through line 27 and subsequently stripped of solvent in stripper 16. The wax may or may not require further purification prior to use.

The cold filtrate may be employed to partially cool the waxy oil-solvent mixture being fed to the crystallizer, if so desired. In any event the solvent associated with the oil after the dewaxing operation is flashed from the oil in a suitable column 15 to recover the solvent and to produce the desired dewaxed oil. The oil flows from the filter to column 15 through line 28.

It is apparent that this embodiment of the present invention may obviously be varied or modified in numerous ways. For example, it may be desirable in ketone-dewaxing some waxy lube oil fractions in the continuous crystallizer just described by utilizing a two step operation. The oil to be dewaxed in this instance may be chilled first under conditions favoring crystal nuclei formation and then subsequently chilled under conditions particularly favorable to crystal growth.

As applied to the dewaxing of a waxy petroleum fraction, about 0.2 volume of solvent (of the ketone type) or less per volume of petroleum feed is added to the feed at point 5. This mixture is then chilled in chiller 6 to a temperature of about 60° F. to 100° F. It will be noted that the mixture is not pulsated as yet according to this variation of the invention; pulsators 9 and 10 are therefore not used.

The partially chilled mixture flows from chiller 6 through line 23 to the subsequent chillers 7 and 8. Additional solvent, sufficient to attain the solvent to oil ratios given earlier, flows through line 30 and mixes with the partially chilled material at point 31. This blend then flows through chillers 7 and 8 where it is pulsated by pulsator 10. Other operating conditions such as those embracing the separation and stripping steps are maintained the same as previously described.

It is apparent then that the number and location of the pulsators may be varied considerably to accommodate any particular processing problem. It will be noted further that the number and arrangement of the filters, the points at which the solvent and oil are mixed and the points at which pulsations are applied may be varied without departing from the spirit or scope of the invention.

While the example chosen to illustrate the present invention in most detail is that of the crystallization and separation of wax from a petroleum oil fraction in double pipe crystallizers, it is contemplated that this invention may be employed in a wide variety of crystallization processes, where an improvement in the size, regularity or uniformity of the crystals produced, or an increase in the crystallizing rate which can be used to make crystals of a given quality is desired. Among the many other possible applications may be listed the following:

1. Solvent dewaxing of petroleum fractions using propane both as solvent and as an auto-refrigerant.
2. Wax de-oiling or fractionation according to melting point by re-crystallization.
3. Separation by melting point of vegetable or animal fats and oils.
4. Separation and purification of other organic materials of a crystalline nature including sugar.
5. Separation and purification of inorganic crystalline materials, such as various salts.

The term "mother liquor" generally refers to the residual saturated liquid which remains after the crystallization of a portion of a liquid or solution. In describing the present invention, this term has been used in referring to the solution or liquid from which crystals are to be produced or are being produced as well to the residual liquid.

What is claimed:

1. Improved process for forming crystals from a mother liquor which comprises agitating the mass of liquor during the formation of crystals by pulsating said mass of liquor at frequencies of 20 to 300 pulses per minute, successive pulses being directionally opposite to one another, each pulse imparting a uniform flow movement between ¼ and 4 inches in amplitude to the entire liquor mass.

2. Process as defined in claim 1 in which the mass of liquor is pulsated at frequencies of 30 to 120 pulses per minute.

3. Process as defined in claim 1 wherein the crystals are formed by chilling.

4. Process as defined in claim 1 wherein the crystals are formed by evaporation.

5. Process as defined in claim 1 wherein the mass of liquor is subjected to a mild degree of random mixing.

6. Improved process for forming crystals from a mother liquor which comprises agitating the mass of liquor during the formation of crystals by pulsating said mass of liquor at frequencies of 20 to 300 pulses per minute in a reciprocating manner, each pulse imparting a flow movement from ¼ to 4 inches in amplitude uniformly to the entire liquor mass.

7. Process as defined in claim 6 in which frequencies of 30 to 120 pulses per minute and pulse amplitudes of ½ inch to 3 inches are employed.

8. Process as defined in claim 6 in which the crystals are formed by chilling.

9. Process as defined in claim 6 wherein the crystals are formed by evaporation.

10. In crystallization apparatus including a crystallizing vessel, and means for charging and removing a mother liquor to and from said vessel, the improvement which comprises reciprocating-type agitation means for uniformly pulsating substantially the entire body of mother liquor at frequencies of 20 to 300 pulses per minute and with pulse amplitudes of ¼ inch to 4 inches.

11. Apparatus as defined in claim 10 wherein a second agitation means is included for supplying a mild degree of random mixing to the mother liquor in the crystallizing vessel.

12. In continuous crystallizing apparatus including a conduit and means for causing a mother liquor to flow through said conduit, the improvement which comprises means for superimposing a reciprocating pulsating flow upon the normal flow of said mother liquor, said pulsating flow being characterized by frequencies of 20 to 300 pulses per minute and amplitudes of ¼ inch to 4 inches, each pulse being applied to move the entire mass of liquor substantially uniformly.

13. In a solvent-dewaxing process for crystallizing wax from a waxy mineral oil, the improvement which comprises mixing a dewaxing solvent with the mineral oil, chilling the resulting mixture and simultaneously pulsating said mixture at frequencies of 20 to 300 pulses per minute, each pulse imparting a pulsing flow movement between ¼ and 4 inches in pulse amplitude uniformly to the entire liquor mass, successive flow pulsations being directionally opposite to one another.

14. Process as defined in claim 13 in which all of the dewaxing solvent is added to the mineral oil prior to chilling.

15. Process as defined in claim 13 in which the dewaxing solvent is added to the mineral oil incrementally during the chilling step.

16. In the art of solvent-dewaxing mineral oils, the improvement which comprises chilling a mineral oil containing 0.2 volume or less of solvent per volume of oil to a temperature between 60° F. and 100° F., mixing the chilled oil with an additional amount of solvent sufficient to attain conventional solvent to oil dewaxing ratios, chilling the resulting mixture sufficiently to obtain a dewaxed oil having a desired pour point and pulsating said mixture during the second chilling operation at frequencies of 20 to 300 pulses per minute, successive pulses being directionally opposite to each other, each pulse imparting a flow movement between ¼ and 4 inches in amplitude uniformly to the entire liquor mass.

17. An evaporative crystallizer comprising a vessel, means for charging a mother liquor to said vessel, a partition positioned within said vessel, said partition extending from the top of the vessel to a point removed from the bottom of the vessel and dividing the vessel into two compartments, a conduit, means for vaporizing volatile components of said mother liquor, means for permitting the resulting vapors to flow from said compartments to said conduit, means for pulsing said mother liquor between the compartments at frequencies of 20 to 300 pulses per minute and pulse amplitudes of greater than ¼ inch, and means for withdrawing crystals and unvaporized liquid components of said mother liquor from said vessel.

References Cited in the file of this patent

UNITED STATES PATENTS

| | | |
|---|---|---|
| 2,204,180 | Gerlach | June 11, 1940 |
| 2,229,658 | Jenkins | Jan. 28, 1941 |
| 2,459,869 | Christensen et al. | Jan. 25, 1949 |
| 2,463,845 | Backlund et al. | Mar. 8, 1949 |
| 2,484,829 | Holden | Oct. 18, 1949 |
| 2,562,325 | Merritt | July 31, 1951 |
| 2,589,310 | Tournier | Mar. 18, 1952 |

FOREIGN PATENTS

| | | |
|---|---|---|
| 14,114 | Great Britain | Oct. 25, 1884 |

OTHER REFERENCES

Badger et al.: "Elements of Chemical Engineering," 2nd edition, McGraw-Hill Book Co., pages 459–462 (1936).